United States Patent
Terwilliger

(12) 
(10) Patent No.: US 12,071,890 B1
(45) Date of Patent: Aug. 27, 2024

(54) RECOVERING WATER AND/OR HEAT ENERGY FROM POWERPLANT COMBUSTION PRODUCTS

(71) Applicant: Raytheon Technologies Corporation, Farmington, CT (US)

(72) Inventor: Neil J. Terwilliger, Cheshire, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

(21) Appl. No.: 18/119,182

(22) Filed: Mar. 8, 2023

(51) Int. Cl.
*F02C 3/30* (2006.01)
*F01D 25/32* (2006.01)

(52) U.S. Cl.
CPC ............... *F02C 3/30* (2013.01); *F01D 25/32* (2013.01); *F05D 2220/323* (2013.01); *F05D 2220/62* (2013.01); *F05D 2220/72* (2013.01); *F05D 2260/213* (2013.01)

(58) Field of Classification Search
CPC ...... F02C 3/30; F01D 25/32; F05D 2220/323; F05D 2220/62; F05D 2220/72; F05D 2260/213; F28G 1/163; F28G 9/00; F28G 9/005
See application file for complete search history.

(56) References Cited

U.S. PATENT DOCUMENTS

| | | | |
|---|---|---|---|
| 4,922,937 A * | 5/1990 | Bloch | F28G 9/00 134/22.12 |
| 5,014,508 A | 5/1991 | Lifka | |
| 5,052,176 A | 10/1991 | Labatut | |
| 5,564,269 A * | 10/1996 | Briesch | F01K 21/042 60/39.55 |
| 6,269,626 B1 * | 8/2001 | Kim | F02C 6/18 122/7 B |
| 7,721,524 B2 | 5/2010 | Jahnsen | |
| 8,628,628 B1 * | 1/2014 | Bonner | F28G 9/00 134/166 R |
| 8,999,072 B2 * | 4/2015 | Varrin, Jr. | F22B 37/002 134/22.12 |
| 9,217,566 B2 * | 12/2015 | Bloch | B08B 3/02 |

(Continued)

FOREIGN PATENT DOCUMENTS

| EP | 1354794 B1 | 4/2006 |
|---|---|---|
| EP | 3048281 B1 | 4/2017 |

(Continued)

*Primary Examiner* — Jesse S Bogue
(74) *Attorney, Agent, or Firm* — Getz Balich LLC

(57) ABSTRACT

A powerplant includes a turbine engine core configured to power a mechanical load. The turbine engine core includes a core compressor section, a core combustor section and a core turbine section. A recovery system includes a condenser and an evaporator. A core flowpath extends sequentially through the core compressor section, the core combustor section, the core turbine section, the evaporator and the condenser from an inlet into the core flowpath to an exhaust from the core flowpath. The recovery system is configured to condense water vapor flowing through the core flowpath into water using the condenser. The recovery system is configured to evaporate the water into steam using the evaporator and to provide the steam to the turbine engine core during a first mode of operation. The recovery system is configured to flow the water through the evaporator during a second mode of operation.

20 Claims, 9 Drawing Sheets

(56) References Cited

U.S. PATENT DOCUMENTS

| | | | |
|---|---|---|---|
| 10,047,702 B2* | 8/2018 | Sabnis | F02K 1/52 |
| 11,441,452 B2* | 9/2022 | Shino | F02C 6/18 |
| 11,578,653 B2* | 2/2023 | Migl | F01K 23/10 |
| 11,702,954 B1* | 7/2023 | Valois | F01D 21/003 |
| | | | 415/1 |
| 11,828,200 B2* | 11/2023 | Terwilliger | F01K 7/12 |
| 2014/0137564 A1* | 5/2014 | Scipio | F02C 3/30 |
| | | | 60/39.53 |
| 2017/0058717 A1* | 3/2017 | Matsumoto | F01K 7/16 |
| 2019/0309685 A1 | 10/2019 | Stillman | |
| 2021/0001269 A1 | 1/2021 | Klingels | |
| 2021/0207500 A1* | 7/2021 | Klingels | F01K 23/10 |
| 2021/0285851 A1 | 9/2021 | Farouz-Fouquet | |
| 2023/0150678 A1* | 5/2023 | Klingels | B01D 5/0081 |
| | | | 244/55 |
| 2023/0313703 A1* | 10/2023 | Fujimura | F01D 17/12 |
| | | | 60/657 |

FOREIGN PATENT DOCUMENTS

| | | |
|---|---|---|
| GB | 870268 A | 6/1961 |
| GB | 2190964 A | 12/1987 |
| RU | 2561757 C1 | 9/2015 |

\* cited by examiner

RECOVERING WATER AND/OR HEAT ENERGY FROM POWERPLANT COMBUSTION PRODUCTS

BACKGROUND OF THE DISCLOSURE

1. Technical Field

This disclosure relates generally to a powerplant and, more particularly, to recovering water and/or heat energy from combustion products of the powerplant turbine engine.

2. Background Information

As government emissions standards tighten, interest in alternative fuels for turbine engines continues to grow. There is interest, for example, in fueling a turbine engine with hydrogen ($H_2$) fuel rather than a traditional hydrocarbon fuel such as kerosine to reduce greenhouse emissions. Combustion products produced by combusting hydrogen ($H_2$) fuel include water vapor, and exhausted combustion products carry waste heat energy. Various systems and methods are known in the art for recovering the water vapor and/or the heat energy. While these known systems and methods have various advantages, there is still room in the art for improvement.

SUMMARY OF THE DISCLOSURE

According to an aspect of the present disclosure, a powerplant is provided for an aircraft. This powerplant includes a mechanical load, a turbine engine core, a recovery system and a core flowpath. The turbine engine core is configured to power the mechanical load. The turbine engine core includes a core compressor section, a core combustor section and a core turbine section. The recovery system includes a condenser and an evaporator. The core flowpath extends sequentially through the core compressor section, the core combustor section, the core turbine section, the evaporator and the condenser from an inlet into the core flowpath to an exhaust from the core flowpath. The recovery system is configured to condense water vapor flowing through the core flowpath into water using the condenser. The recovery system is configured to evaporate the water into steam using the evaporator and to provide the steam to the turbine engine core during a first mode of operation. The recovery system is configured to flow the water through the evaporator during a second mode of operation.

According to another aspect of the present disclosure, another powerplant is provided for an aircraft. This powerplant includes a turbine engine core, a recovery system and a core flowpath. The turbine engine core includes a core compressor section, a core combustor section and a core turbine section. The recovery system includes an evaporator, a condenser, a water separator, a steam turbine, a first flow circuit, a second flow circuit and a valve. The water separator is arranged with the condenser and fluidly coupled with the first flow circuit and the second flow circuit though the evaporator. The first flow circuit extends through the steam turbine. The second flow circuit bypasses the steam turbine. The recovery system is configured to selectively divert fluid output from the evaporator into the first flow circuit or the second flow circuit using the valve. The core flowpath extends sequentially through the core compressor section, the core combustor section, the core turbine section, the evaporator and the condenser from an inlet into the core flowpath to an exhaust from the core flowpath.

According to still another aspect of the present disclosure, a method is provided for operating an aircraft powerplant. This method includes steps of: exhausting combustion products from a turbine section of a turbine engine core; condensing water vapor in the combustion products into water using a condenser; evaporating the water using an evaporator during a first mode of operation to provide steam, and providing the steam to a component of the turbine engine core; and flowing the water through the evaporator during a second mode of operation to at least partially remove a material deposit from within the evaporator.

The method may also include steps of: directing the water into the evaporator during the first mode of operation at a first flow rate and directing the water into the evaporator during the second mode of operation at a second flow rate greater than the first flow rate. The method may still also or alternatively include steps of: operating the turbine engine core at a first power setting during the first mode of operation and operating the turbine engine core at a second power setting that is less than the first power setting during the second mode of operation.

The first flow circuit and the second flow circuit may be fluidly coupled in parallel between the evaporator and a component of the core combustion section.

The first flow circuit may be configured to direct the fluid to the turbine engine core. The second flow circuit may be configured to direct the fluid away from the turbine engine core.

The recovery system may be configured to direct the water into the evaporator at: a first flowrate during the first mode of operation; and a second flowrate greater than the first flowrate during the second mode of operation.

The turbine engine core may be configured to operate at: a first power setting during the first mode of operation; and a second power setting less than the first power setting during the second mode of operation.

The recovery system may be configured to at least partially remove a material deposit from within the evaporator by flowing the water through the evaporator during the second mode of operation.

The recovery system may include a detergent source. The recovery system may also be configured to direct a detergent received from the detergent source into the evaporator during the second mode of operation.

The recovery system may be configured to exhaust the water and the detergent, which is output from the evaporator during the second mode of operation, out of the powerplant while bypassing the turbine engine core.

The recovery system may also include a steam turbine driven by the steam output from the evaporator during the first mode of operation. The recovery system may be configured to divert the water output from the evaporator away from the steam turbine during the second mode of operation.

The recovery system may also include a steam turbine. The water recovery system may be configured to direct the steam output from the evaporator through the steam turbine to a component of the turbine engine core during the first mode of operation. The water recovery system may be configured to direct the water output from the evaporator to the component of the turbine engine core during the second mode of operation while bypassing the steam turbine.

The evaporator may be a first evaporator, and the recovery system may also include a second evaporator. The recovery system may be configured to superheat the steam output from the first evaporator using the second evaporator during the first mode of operation. The recovery system may be configured to evaporate the water output from the first evaporator using the second evaporator during the second mode of operation.

The second evaporator may be fluidly coupled between the core turbine section and the first evaporator along the core flowpath.

The evaporator may be a second evaporator, and the recovery system may also include a first evaporator. The recovery system may be configured to preheat the water using the first evaporator and evaporate the preheated water using the second evaporator during the first mode of operation. The recovery system may be configured to preheat the water using the second evaporator and evaporate the preheated water using the first evaporator during the second mode of operation.

The second evaporator may be fluidly coupled between the core turbine section and the first evaporator along the core flowpath.

The evaporator may be a first evaporator, and the recovery system may also include a second evaporator. The recovery system may be configured to superheat the steam output from the first evaporator using the second evaporator during the first mode of operation. The recovery system may be configured to provide a first portion of the water to the first evaporator and a second portion of the water to the second evaporator during the second mode of operation. The recovery system may be configured to flow the first portion of the water through the first evaporator during the second mode of operation. The recovery system may be configured to evaporate the second portion of the water into steam using the second evaporator during the second mode of operation.

The recovery system may be configured to exhaust the first portion of the water, which is output from the first evaporator during the second mode of operation, out of the powerplant while bypassing the second evaporator.

The second evaporator may be fluidly coupled between the core turbine section and the first evaporator along the core flowpath.

The recovery system may be configured to provide a first portion of the water to the first evaporator and a second portion of the water to the second evaporator during a third mode of operation. The recovery system may be configured to evaporate the first portion of the water into steam using the first evaporator during the third mode of operation. The recovery system may be configured to flow the second portion of the water through the second evaporator during the third mode of operation.

The recovery system may be configured to exhaust the second portion of the water, which is output from the second evaporator during the third mode of operation, out of the powerplant while bypassing the first evaporator.

The mechanical load may be configured as or otherwise include a propulsor rotor.

The turbine engine core may also include a power turbine section configured to drive rotation of the mechanical load. The power turbine section may be arranged along the core flowpath between the core turbine section and the evaporator.

The water flowed through the evaporator during the second mode of operation may be received from a reservoir and/or another water source. The reservoir and/or the other water source may be included as part of the recovery system. Alternatively, the reservoir and/or the other water source may be external to the recovery system.

During the second mode of operation, a combustor in the core combustor section may be non-operational.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
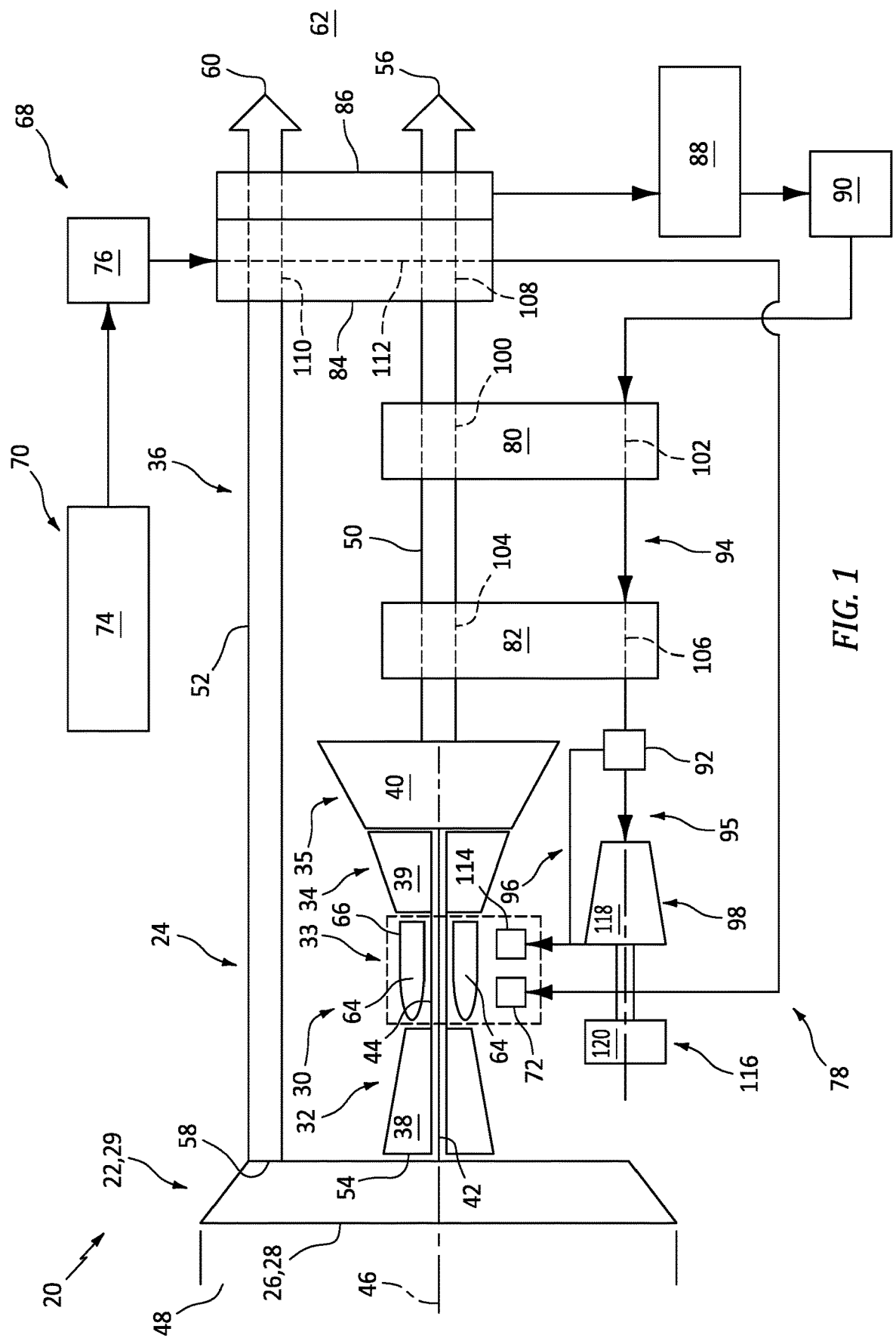
FIG. 1 is a schematic illustration of a powerplant with a water and energy recovery system.

FIG. 1 illustrates a powerplant 20 for an aircraft. The aircraft may be an airplane, a drone (e.g., an unmanned aerial vehicle (UAV)) or any other manned or unmanned aerial vehicle. The powerplant 20 may be configured as, or otherwise included as part of, a propulsion system for the aircraft. The powerplant 20 may also or alternatively be configured as, or otherwise included as part of, an electrical power system for the aircraft. The powerplant 20 of FIG. 1 includes a mechanical load 22 and a powerplant engine 24; e.g., a gas turbine engine.

The mechanical load 22 of FIG. 1 includes at least one driven rotor 26. This driven rotor 26 may be configured as a bladed propulsor rotor for the aircraft propulsion system. Examples of the propulsor rotor include, but are not limited to, a fan rotor 28 for a ducted fan engine (e.g., a turbofan engine), a propeller rotor for a propeller engine (e.g., a turboprop engine), and an open rotor for an open rotor engine (e.g., a pusher fan engine, an open tractor rotor engine, etc.). The driven rotor 26 may alternatively be configured as a generator rotor in an electric power generator for the power system. However, for ease of description, the mechanical load 22 is described below as a fan section 29 of the powerplant 20 and the driven rotor 26 is described below as the fan rotor 28.

The powerplant engine 24 of FIG. 1 includes a turbine engine core 30; e.g., a gas generator. This engine core 30 includes a core compressor section 32, a core combustor section 33 and a core turbine section 34. The powerplant engine 24 of FIG. 1 also includes a power turbine (PT) section 35 and an exhaust section 36. Here, the core turbine section 34 is configured as a high pressure turbine (HPT) section of the powerplant engine 24 and the PT section 35 is configured as a low pressure turbine (LPT) section of the powerplant engine 24.

Each of the powerplant sections 32, 34 and 35 includes a respective bladed rotor 38-40. Each of the rotors 28 and 38-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 28 is connected to and driven by the LPT rotor 40 through a low speed shaft 42. At least (or only) the fan rotor 28, the low speed shaft 42 and the LPT rotor 40 may form a low speed rotating structure; e.g., a low speed spool. This low speed rotating structure may be configured as a direct drive rotating structure where the fan rotor 28 and the LPT rotor 40 rotate at a common speed. The low speed rotating structure, however, may alternatively be configured as a geared rotating structure with a geartrain (e.g., an epicyclic gearbox) coupled between the fan rotor 28 and the LPT rotor 40. With such an arrangement, the fan rotor 28 rotates at a different (e.g., slower) speed than the LPT rotor 40. The compressor rotor 38 is connected to and driven by the HPT rotor 39 through a high speed shaft 44. At least (or only) the compressor rotor 38, the high speed shaft 44 and the HPT rotor 39 may form a high speed rotating structure; e.g., a high speed spool. Each of the powerplant rotating structures may be supported by a plurality of bearings and rotate about a rotational axis 46, which rotational axis 46 may also be an axial centerline of the powerplant 20, the powerplant engine 24 and/or the engine core 30.

During operation of the powerplant 20 of FIG. 1, air enters the powerplant 20 through an airflow inlet 48 into the powerplant 20. This air is directed through the fan section 29 and into a core flowpath 50 (e.g., annular core flowpath) and a bypass flowpath 52 (e.g., annular bypass flowpath). The core flowpath 50 extends sequentially through the compressor section 32, the combustor section 33, the HPT section 34, the LPT section 35 and the exhaust section 36 from an inlet 54 into the core flowpath 50 to an exhaust 56 out of the core flowpath 50. The air within the core flowpath 50 may be referred to as "core air". The bypass flowpath 52 extends through a bypass duct, which bypasses (e.g., is radially outboard of and extends along) the powerplant engine 24 and its engine core 30, from an inlet 58 into the bypass flowpath 52 to an exhaust 60 out of the bypass flowpath 52. The air within the bypass flowpath 52 may be referred to as "bypass air". Briefly, the core inlet 54 and the bypass inlet 58 may each be fluidly coupled with, adjacent and downstream of the fan section 29. The airflow inlet 48, the core exhaust 56 and the bypass exhaust 60 may each be fluidly coupled with an environment 62 external to the powerplant 20; e.g., an external environment outside of the aircraft.

The core air is compressed by the compressor rotor 38 and directed into a combustion chamber 64 of a combustor 66 (e.g., an annular combustor) in the combustor section 33. Fuel is injected into the combustion chamber 64 and mixed with the compressed core air to provide a fuel-air mixture. This fuel-air mixture is ignited and combustion products thereof flow through and sequentially cause the HPT rotor 39 and the LPT rotor 40 to rotate. The rotation of the HPT rotor 39 drives rotation of the compressor rotor 38 and, thus, compression of the air received from the core inlet 54. The rotation of the LPT rotor 40 drives rotation of the fan rotor 28, which propels the bypass air through and out of the bypass flowpath 52. The propulsion of the bypass air may account for a majority of thrust generated by the aircraft propulsion system. Of course, where the mechanical load 22 also or alternatively includes the generator rotor, the rotation of the LPT rotor 40 may drive the electric power generator to generate electricity.

Figure 2:
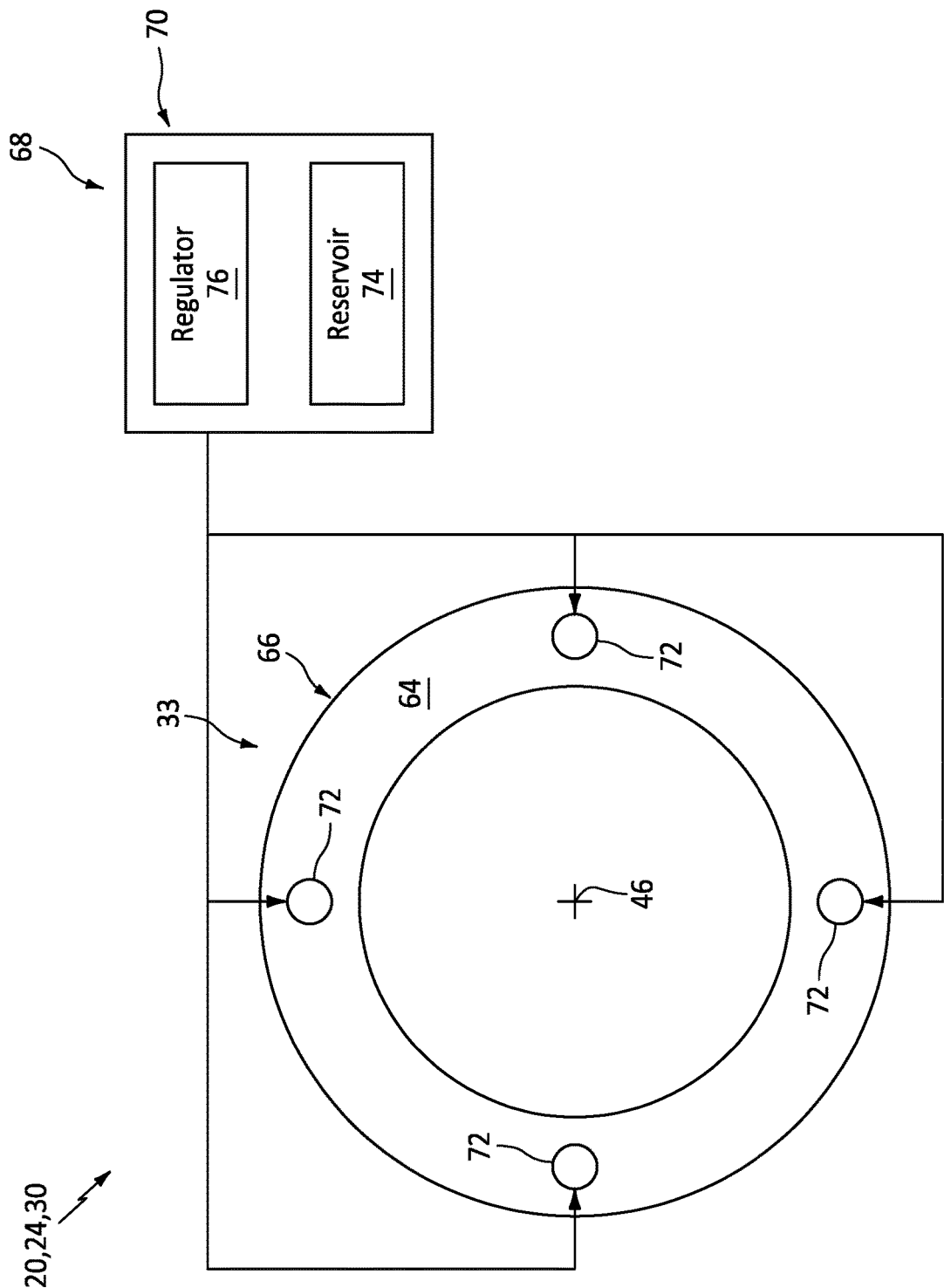
FIG. 2 is a schematic illustration of a fuel system for the powerplant.

Referring to FIG. 2, the powerplant 20 includes a fuel system 68 for delivering the fuel to the combustor section 33 and its combustor 66. This fuel system 68 includes a fuel source 70 and one or more fuel injectors 72. The fuel source 70 of FIG. 2 includes a fuel reservoir 74 and/or a fuel flow regulator 76; e.g., a valve and/or a pump. The fuel reservoir 74 is configured to store the fuel before, during and/or after turbine engine operation. The fuel reservoir 74, for example, may be configured as or otherwise include a tank, a cylinder, a pressure vessel, a bladder or any other type of fuel storage container. The fuel flow regulator 76 is configured to direct and/or meter a flow of the fuel from the fuel reservoir 74 to the fuel injectors 72. The fuel injectors 72 may be arranged circumferentially about the rotational axis 46 in an array. Each fuel injector 72 is configured to direct the fuel received from the fuel source 70 into the combustion chamber 64 for mixing with the compressed core air to provide the fuel-air mixture.

The powerplant engine 24 of FIG. 1 may be configured as a non-hydrocarbon turbine engine/a hydrocarbon free turbine engine. The turbine engine, for example, may be configured as a hydrogen fueled turbine engine. The fuel injected into the combustion chamber 64 by the fuel injectors 72, for example, may be hydrogen ($H_2$) fuel; e.g., $H_2$ gas. The present disclosure, however, is not limited to hydrogen fueled turbine engines nor to non-hydrocarbon turbine engines. The powerplant engine 24, for example, may also or alternatively be fueled by another non-hydrocarbon fuel such as, but not limited to, ammonia ($NH_3$). The powerplant engine 24 may still also or alternatively be fueled using any other fuel, including hydrocarbon fuels (e.g., kerosene, jet fuel, sustainable aviation fuel (SAF), etc.), which produces combustion products that include water ($H_2O$) vapor.

The powerplant 20 of FIG. 1 also includes a water and heat energy recovery system 78 ("recovery system"). This recovery system 78 is configured to recover at least some of the water vapor produced by the combustion of the fuel-air mixture within the combustion chamber 64. The recovery system 78 is also configured to evaporate the recovered water using heat energy recuperated from the combustion products to provide steam for use in the powerplant engine 24 and its engine core 30; e.g., in the combustor section 33. The recovery system 78 of FIG. 1, for example, includes one or more evaporators 80 and 82, a condenser 84 and a water separator 86. The recovery system 78 of FIG. 1 may also include a water reservoir 88, a water pump 90, at least one valve 92, a plurality of flow circuits 94-96 and/or a steam turbine 98. The flow circuits of FIG. 1 include an upstream flow circuit 94 and a plurality of downstream flow circuits 95 and 96 that branch off from the upstream flow circuit 94 at an intersection.

The first evaporator 80 includes a gas flowpath 100 (e.g., a combustion products flowpath) and a fluid flowpath 102 (e.g., a water and/or steam flowpath). The second evaporator 82 includes a gas flowpath 104 (e.g., a combustion products flowpath) and a fluid flowpath 106 (e.g., a water and/or steam flowpath). The condenser 84 includes a gas flowpath 108 (e.g., a combustion products flowpath) and one or more heat exchange (HX) flowpaths 110 and 112. The first HX flowpath 110 of FIG. 1 is a gas flowpath (e.g., a bypass air flowpath), and the second HX flowpath 112 of FIG. 1 is a fuel flowpath. It is contemplated, however, the condenser 84 may include a refrigerant flowpath coupled to a refrigerant circuit, where the refrigerant flowpath may be provided in addition to or may replace one or both of the other HX flowpaths 110 and/or 112.

The heat exchangers 80, 82 and 84 may be arranged with (e.g., in) the exhaust section 36. The second evaporator 82, the first evaporator 80 and the condenser 84 are fluidly coupled (e.g., inline and/or sequentially) along the core flowpath 50 between the powerplant engine 24 and its LPT section 35 and the core exhaust 56. The core flowpath 50 of FIG. 1, for example, extends out from the LPT section 35, sequentially through the second evaporator gas flowpath 104, the first evaporator gas flowpath 100 and the condenser gas flowpath 108, and to the core exhaust 56. It is contemplated, however, the order of the heat exchangers 80, 82 and 84 along the core flowpath 50 may be different in other embodiments.

The water separator 86 is arranged with the condenser 84 along the core flowpath 50. The water separator 86, for example, may be configured as or otherwise include a gutter integrated with (e.g., into) the condenser 84, or connected downstream of the condenser 84 along the core flowpath 50. However, various other types of separators are known in the art, and the present disclosure is not limited to any particular ones thereof.

The water reservoir 88 is configured to hold water before, during and/or after recovery system operation. The water reservoir 88, for example, may be configured as or otherwise include a tank, a cylinder, a pressure vessel, a bladder or any other type of water storage container. The water pump 90 is configured to direct and/or meter a flow of the water from the water reservoir 88 to one or more downstream members of the recovery system 78.

The upstream flow circuit 94 may include the water reservoir 88, the water pump 90, the first evaporator 80 and the second evaporator 82. The upstream flow circuit 94 of FIG. 1, for example, extends sequentially through the water reservoir 88, the water pump 90, the first evaporator fluid flowpath 102 and the second evaporator fluid flowpath 106 from an outlet of the water separator 86 to the intersection with the downstream flow circuits 95 and 96.

The first downstream flow circuit 95 ("first flow circuit") may include and extend through the steam turbine 98. The second downstream flow circuit 96 ("second flow circuit") may bypass (e.g., extend around, not extend through, etc.) the steam turbine 98. The first flow circuit 95 and the second flow circuit 96 of FIG. 1, for example, are arranged in parallel between the intersection with the upstream flow circuit 94 and one or more components 114 (one shown in FIG. 1 for ease of illustration) of the powerplant engine 24 and its engine core 30. One or more of these components 114 may each be configured as or otherwise include a steam injector. Each steam injector may be configured to inject the steam into the combustion chamber 64. One or more of the components 114 may also or alternatively be configured as an outlet for introducing the steam for cooling the combustor 66; e.g., a combustor wall, etc. The present disclosure, however, is not limited to the foregoing exemplary components which utilize the steam. In particular, various other uses for steam in a powerplant engine 24 are known in the art, and the present disclosure is not limited to any particular one thereof.

The valve 92 is configured to selectively couple the upstream flow circuit 94 to the first flow circuit 95 and/or the second flow circuit 96. The valve 92, for example, may fluidly couple the upstream flow circuit 94 (e.g., only) to the first flow circuit 95 during a first mode of operation; e.g., a nominal mode of powerplant operation, a high power mode of operation, etc. The valve 92 may alternatively fluidly couple the upstream flow circuit 94 (e.g., only) to the second flow circuit 96 during a second mode of operation; e.g., a cleaning mode of powerplant operation, a low power mode of operation, etc.

The steam turbine 98 is configured to drive a second mechanical load 116. The steam turbine 98 of FIG. 1, for example, includes a bladed steam turbine rotor 118 disposed in the first flow circuit 95. This steam turbine rotor 118 is connected to a second driven rotor 120 of the second mechanical load 116 through a drivetrain; e.g., at least one shaft, a geartrain, etc. The second driven rotor 120 may be configured as a bladed propulsor rotor. The second driven rotor 120 may also or alternatively be configured as a generator rotor. The second driven rotor 120 may still also or alternatively be configured as a driver for one or more pumps. The present disclosure, however, is not limited to the foregoing exemplary second driven rotor configurations. Furthermore, while the second mechanical load 116 and its second driven rotor 120 are described as discrete elements from the mechanical load 22 and its driven rotor 26, it is contemplated the mechanical loads 22 and 116 and the driven rotors 26 and 120 may be the same in other embodiments.

During operation of the recovery system 78, the bypass air may be directed into the condenser 84 and its first HX flowpath 110. The fuel may be directed into the condenser 84 and its second HX flowpath 112. The combustion products, including the water vapor, are directed into the condenser 84 and its condenser gas flowpath 108. The condenser 84 exchanges heat energy between the various working fluids—the bypass air, the fuel and the combustion products—flowing within the condenser 84. During normal powerplant operation, the combustion products flowing within the condenser gas flowpath 108 are (e.g., significantly) warmer than the bypass air flowing within the first HX flowpath 110 and the fuel flowing within the second HX flowpath 112. The condenser 84 is thereby operable to cool the combustion products using the bypass air and/or the fuel. This cooling of the combustion products may condense at least some of the water vapor (e.g., the gaseous water) flowing within the condenser gas flowpath 108 into liquid water droplets. At least some or all of the liquid water may be collected and separated from the remaining gaseous combustion products by the water separator 86 and subsequently directed to the water reservoir 88 for (e.g., temporary) storage through an upstream section of the upstream flow circuit 94.

During the first mode of operation, the water pump 90 directs (e.g., pumps) the water from the water reservoir 88 into the first evaporator 80 and its first evaporator fluid flowpath 102. The combustion products (e.g., upstream of the condenser 84, downstream of the second evaporator 82) are directed into the first evaporator 80 and its first evaporator gas flowpath 100. The first evaporator 80 exchanges heat energy between the water and the combustion products flowing within the first evaporator 80. During normal powerplant operation, the combustion products flowing within the first evaporator gas flowpath 100 are (e.g., significantly) warmer than the water flowing within the first evaporator fluid flowpath 102. The first evaporator 80 is thereby operable to heat the water using the combustion products and recuperate heat energy from the combustion products. This heating of the water may evaporate at least some or all of the liquid water flowing within the first evaporator fluid flowpath 102 into gaseous water—steam.

The steam (or a combination of steam and heated water) output from the first evaporator 80 is directed into the second evaporator 82 and its second evaporator fluid flowpath 106. The combustion products (e.g., upstream of the first evaporator 80, downstream of the LPT section 35) are directed into the second evaporator 82 and its second evaporator gas flowpath 104. The second evaporator 82 exchanges heat energy between the steam (or the combination of steam and heated water) and the combustion products flowing within the second evaporator 82. During normal powerplant operation, the combustion products flowing within the second evaporator gas flowpath 104 are (e.g., significantly) warmer than the steam (or the combination of steam and heated water) flowing within the second evaporator fluid flowpath 106. The second evaporator 82 is thereby operable to further heat (e.g., superheat) the steam and/or completely evaporate any remaining heated water flowing within the second evaporator fluid flowpath 106 using the combustion products and further recuperate heat energy from the combustion products.

The valve 92 is actuated to direct (e.g., all of) the steam output from the second evaporator 82 into the first flow circuit 95 and its steam turbine 98. The valve 92, for example, may fluidly couple the upstream flow circuit 94 to the first flow circuit 95, and the valve 92 may fluidly decouple the upstream flow circuit 94 from the second flow circuit 96. The steam drives rotation of the steam turbine rotor 118, where the rotation of the steam turbine rotor 118 drives rotation of the second driven rotor 120. The steam is then output from the steam turbine 98 to the components 114 through the first flow circuit 95.

Under certain conditions, the water collected by the water separator 86 and directed into the water reservoir 88 may include one or more contaminants. These contaminants may include dust, dirt, sand or other debris ingested by the powerplant 20 through the airflow inlet 48. The contaminants may also or alternatively include other byproducts of the combustion of the fuel-air mixture such as soot and the like, particularly where the fuel is a hydrocarbon fuel. The present disclosure, of course, is not limited to the foregoing exemplary water contaminants.

As the water with the contaminant(s) is evaporated within the first evaporator 80 and/or within the second evaporator 82, the contaminant(s) may be deposited onto one or more internal surfaces of the respective evaporator 80, 82 and its fluid flowpath 102, 106. As these deposits accumulate, a flow area through the respective evaporator fluid flowpath 102, 106 may decrease thereby reducing efficiency of and/or otherwise compromising operation of the respective evaporator 80, 82. The recovery system 78 is configured to (e.g., selectively, periodically, etc.) operate in its second mode of operation to at least partially or completely remove any material deposits (deposits of the contaminants) within one or both of the evaporators 80, 82 and the evaporator fluid flowpaths 102, 106.

During the second mode of operation, the water pump 90 directs (e.g., pumps) the water from the water reservoir 88 into the first evaporator 80 and its first evaporator fluid flowpath 102. The combustion products (e.g., upstream of the condenser 84, downstream of the second evaporator 82) are directed into the first evaporator 80 and its first evaporator gas flowpath 100. The first evaporator 80 exchanges heat energy between the water and the combustion products flowing within the first evaporator 80. The combustion products flowing within the first evaporator gas flowpath 100 may still be warmer than the water flowing within the first evaporator fluid flowpath 102. The first evaporator 80 is thereby operable to heat the water using the combustion products and recuperate heat energy from the combustion products. However, the recovery system 78 may be operated such that little or none of the water is evaporated within the first evaporator 80. The water pump 90, for example, may be operated such that a flowrate of the water into the first evaporator 80 during this second mode of operation is greater than a flowrate of the water into the first evaporator 80 during the first mode of operation. By increasing the flowrate of the water into the first evaporator 80, more of the water may flow faster through the first evaporator 80 such that, for example, little or none of the water is within the first evaporator fluid flowpath 102 long enough to evaporate. In addition or alternatively, the second mode of operation may be selected while the powerplant engine 24 and its engine core 30 are operating at a lower power setting than during the first mode of operation. By operating the powerplant engine 24 and its engine core 30 at the lower power setting, less heat energy may be available in the combustion products for transferring into the water through the first evaporator 80.

The heated water output from the first evaporator 80 is directed into the second evaporator 82 and its second evaporator fluid flowpath 106. The combustion products (e.g., upstream of the first evaporator 80, downstream of the LPT section 35) are directed into the second evaporator 82 and its second evaporator gas flowpath 104. The second evaporator 82 exchanges heat energy between the heated water and the combustion products flowing within the second evaporator 82. The combustion products flowing within the second evaporator gas flowpath 104 may still be warmer than the heated water flowing within the second evaporator fluid flowpath 106. The second evaporator 82 is thereby operable to further heat the heated water using the combustion products and recuperate heat energy from the combustion products. However, the recovery system 78 may also be operated such that little or none of this heated water is evaporated within the second evaporator 82. The water flowrate output by the water pump 90 during the second mode of operation, for example, may also be selected such that little or none of the heated water is within the second evaporator fluid flowpath 106 long enough to evaporate. In addition or alternatively, the lower power setting may be selected such that less heat energy may be available in the combustion products for transferring into the heated water through the second evaporator 82.

The heated water directed through the first evaporator 80 and its first evaporator fluid flowpath 102 and directed through the second evaporator 82 and its second evaporator fluid flowpath 106 may be used to at least partially or completely remove any material deposits accumulated within one or both of the evaporators 80, 82 and the evaporator fluid flowpaths 102, 106. These material deposits may be removed by the force of the water washing (e.g., eroding) away the material deposits. The washing process is further aided by the heating of the water, which heated water may more easily breakdown the material deposits than non-heated water. Of course, it is contemplated some of the water may alternatively be evaporated within the first evaporator 80 and/or the second evaporator 82 such that the fluid washing away the material deposits is a combination of (e.g., mostly) heated water and steam.

The valve 92 is actuated to direct (e.g., all of) the heated water output from the second evaporator 82 into the second flow circuit 96. The valve 92, for example, may fluidly couple the upstream flow circuit 94 to the second flow circuit 96, and the valve 92 may fluidly decouple the upstream flow circuit 94 from the first flow circuit 95. The heated water may thereby bypass/be diverted away from the steam turbine 98 and flow (e.g., directly) to the components 114. Note, directing liquid water into a steam turbine 98 may damage the rotor 118 of the steam turbine 98. Thus, by bypassing the heated water (or the combination of heated water and steam) around the steam turbine 98, longevity of the steam turbine 98 may be preserved.

In some embodiments, referring to FIG. 1, the first flow circuit 95 and the second flow circuit 96 may each lead to the powerplant engine 24 and its engine core 30. Both the first flow circuit 95 and the second flow circuit 96 of FIG. 1, for example, are fluidly coupled with and upstream of the components 114. In other embodiments however, referring to FIG. 3, the second flow circuit 96 may lead away from (e.g., not lead to) the components 114. The second flow circuit 96, for example, may be configured to bypass the powerplant engine 24 and its engine core 30. The second flow circuit 96 of FIG. 3, in particular, is configured to divert the heated water (or the combination of heated water and steam) away from the steam turbine 98, the components 114, the engine core 30, the powerplant engine 24, to an outlet 122 from the powerplant 20. This recovery system outlet 122 may exhaust the heated water (or the combination of heated water and steam) out of the powerplant 20 into the external environment 62 without flowing through the powerplant elements 24, 30, 98, 114.

Figure 3:
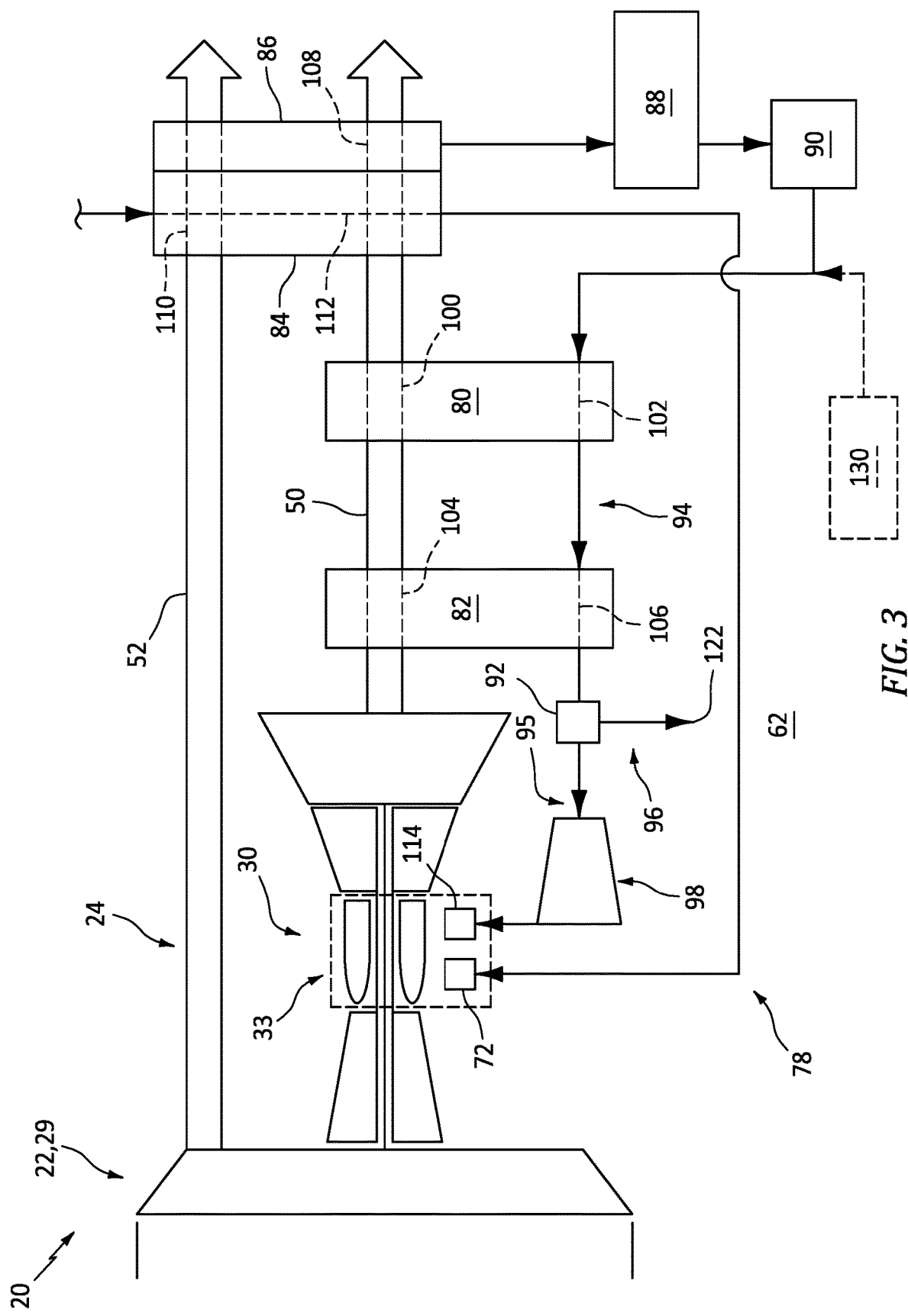
FIG. 3 is a partial schematic illustration of the powerplant with another water and energy recovery system.
Figure 4:
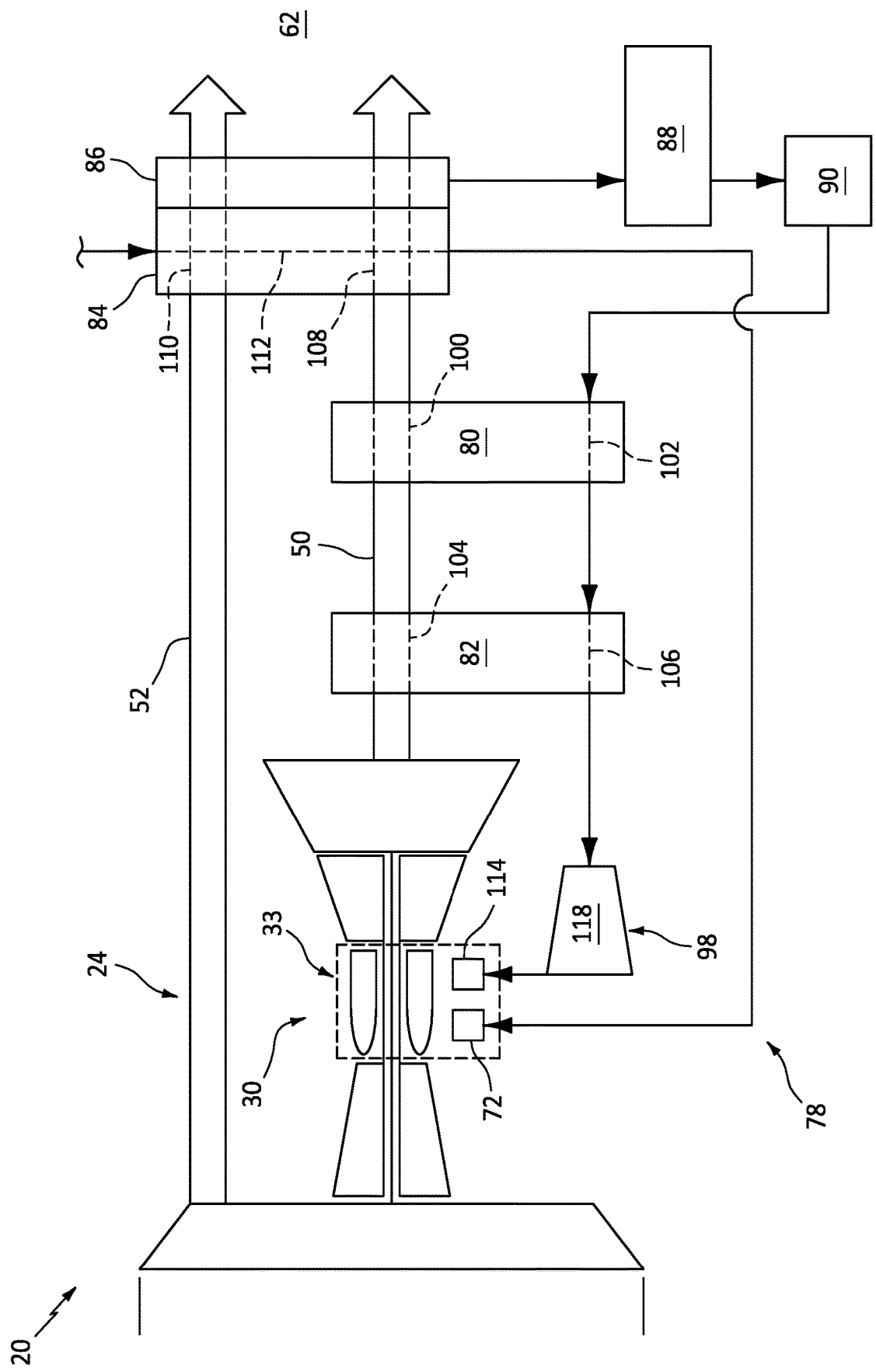
FIG. 4 is a partial schematic illustration of the powerplant with another water and energy recovery system.

In some embodiments, referring to FIG. 4, the recovery system 78 may be configured without the second flow circuit 96 and the valve 92 (see FIGS. 1 and 3). In such embodiments, the steam turbine 98 receives the working fluid output from the second evaporator 82 during both the first and the second modes of operation. With such an arrangement, the first evaporator 80 may be configured to evaporate all or most of the water entering the first evaporator fluid flowpath 102 into steam during the first mode of operation. The second evaporator 82 may then further heat (e.g., superheat) the steam (and evaporate any remaining water (if any) into steam) received from the first evaporator 80 before the working fluid (here, heated steam) is provided to the steam turbine 98. By contrast, during the second mode of operation, the first evaporator 80 may be configured to heat the water entering the first evaporator fluid flowpath 102 without evaporating any (or most) of the water. The second evaporator 82 may then heat and evaporate the heated water received from the first evaporator 80 before the working fluid (here, steam) is provided to the steam turbine 98. With this arrangement, the steam turbine 98 may continue to be driven and/or the components 114 may continue to receive the steam during the second mode of operation.

Figure 5A:
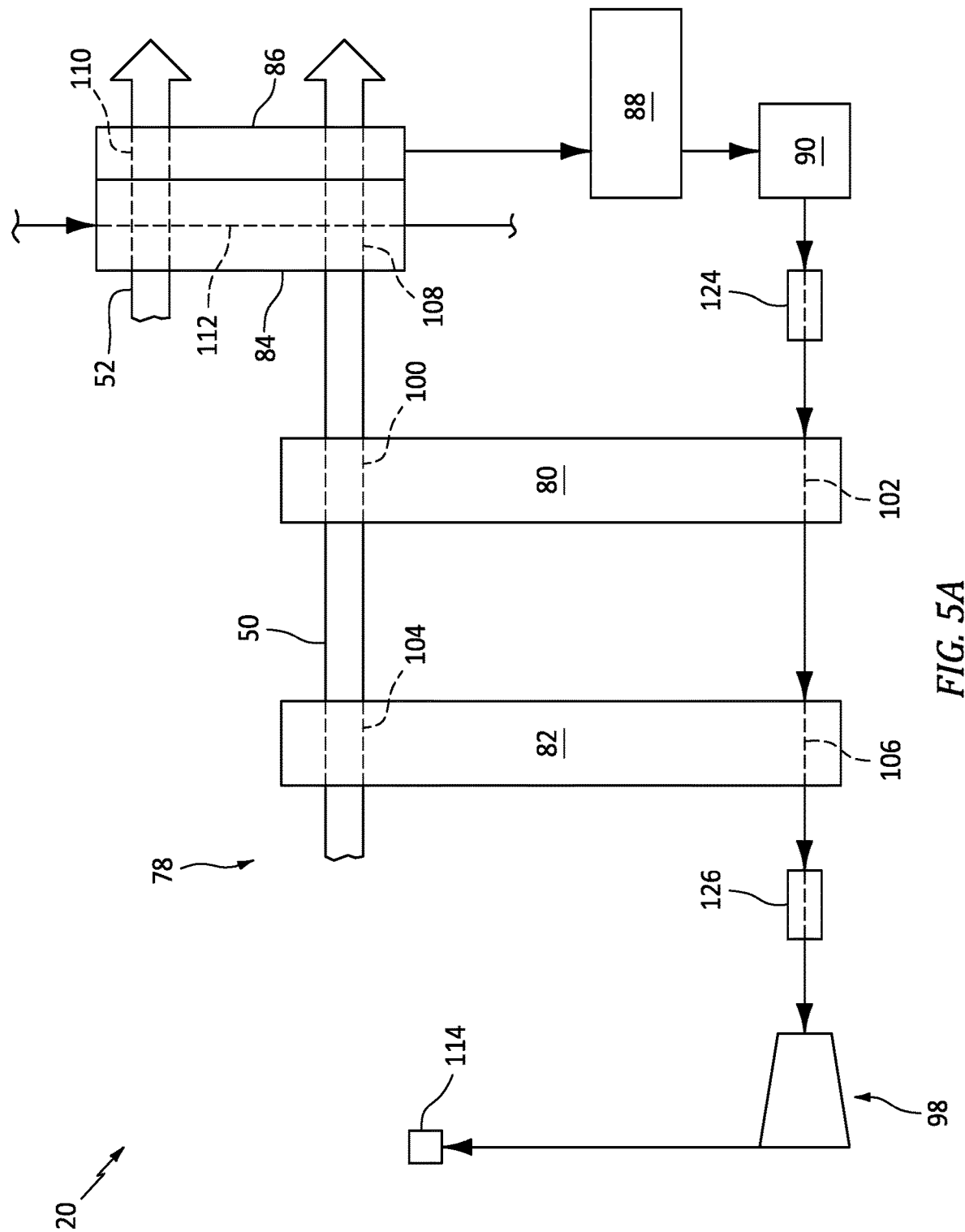
FIGS. 5A and 5B are partial schematic illustrations of the powerplant with another water and energy recovery system during various modes of operation.
Figure 5B:
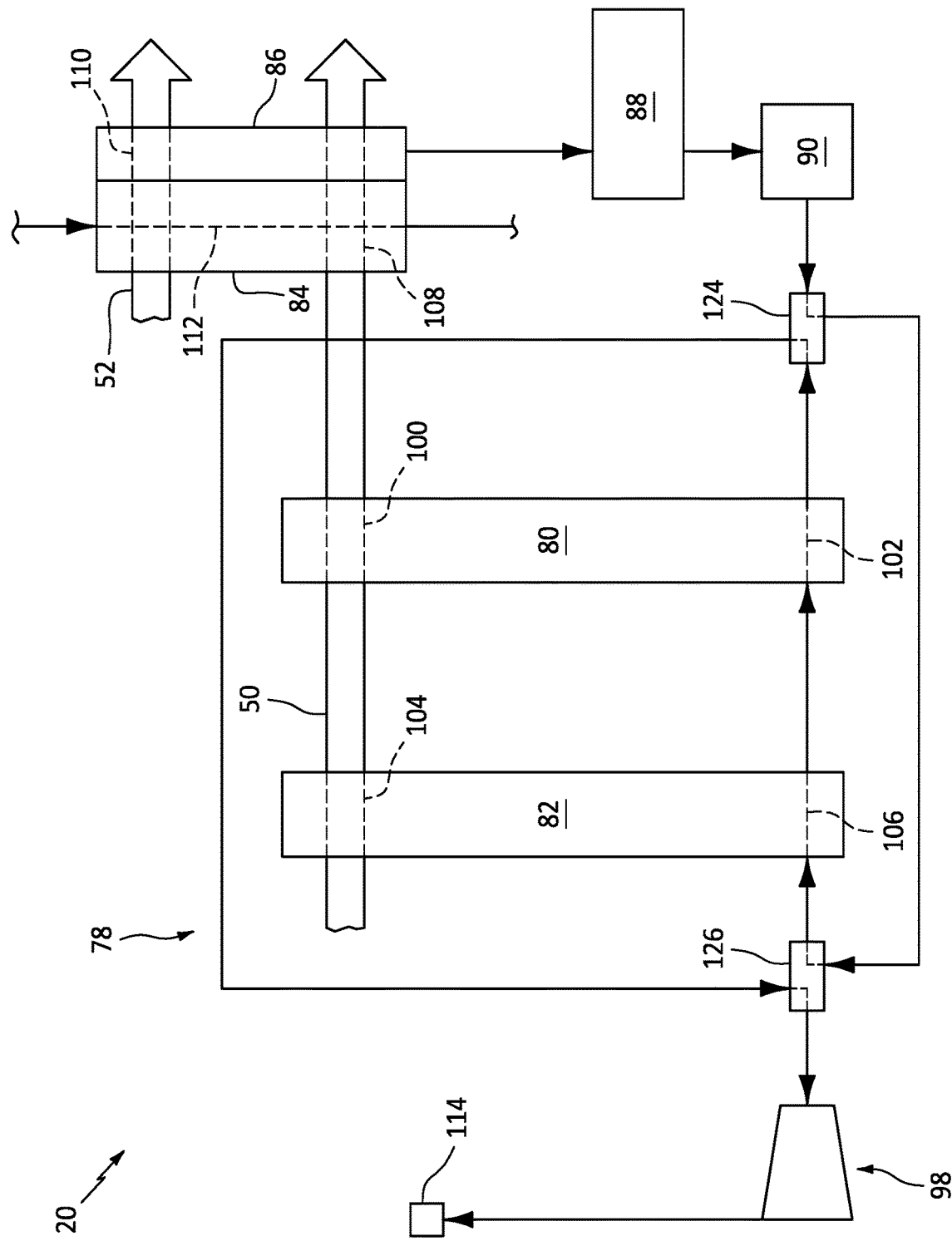

In some embodiments, referring to FIGS. 5A and 5B, the recovery system 78 may be configured to reverse working fluid flow through both the first evaporator 80 and the second evaporator 82 during a third mode of operation. A first valve system 124, for example, may be arranged between the first evaporator 80 and the water pump 90. A second valve system 126 may be arranged between the second evaporator 82 and the steam turbine 98 and/or the components 114.

During the first and the second modes of operation of FIG. 5A, the working fluid may be directed from the water pump 90, sequentially through the first valve system 124, the first evaporator fluid flowpath 102, the second evaporator fluid flowpath 106 and the second valve system 126 to the steam turbine 98. During the first mode of operation, the first evaporator 80 may evaporate some or all of the water into steam, and the second evaporator 82 may heat (e.g., superheat) the steam before providing the heated steam to the steam turbine 98 and/or the components 114. During the second mode of operation, the first evaporator 80 may heat (e.g., preheat) the water (or heat most of the water and evaporate some of the water into steam), and the second evaporator 82 may evaporate (e.g., all or a remaining portion) of the heated water into steam before providing the steam to the steam turbine 98 and/or the components 114.

During the third mode of operation of FIG. 5B, the working fluid may be directed from the water pump 90, sequentially through a path of the first valve system 124, a path of the second valve system 126, the second evaporator fluid flowpath 106, the first evaporator fluid flowpath 102, another path of the first valve system 124 and another path of the second valve system 126 to the steam turbine 98. During this third mode of operation, the second evaporator 82 may heat (e.g., preheat) the water (or heat most of the water and evaporate some of the water into steam), and the first evaporator 80 may evaporate (e.g., all or a remaining portion) of the heated water into steam before providing the steam to the steam turbine 98 and/or the components 114. With the arrangement of FIGS. 5A and 5B, the recovery system 78 is configured to (e.g., individually) washout each evaporator 80, 82 during the second and the third modes of operation while still providing steam to the steam turbine 98 and/or the components 114.

Figure 6A:
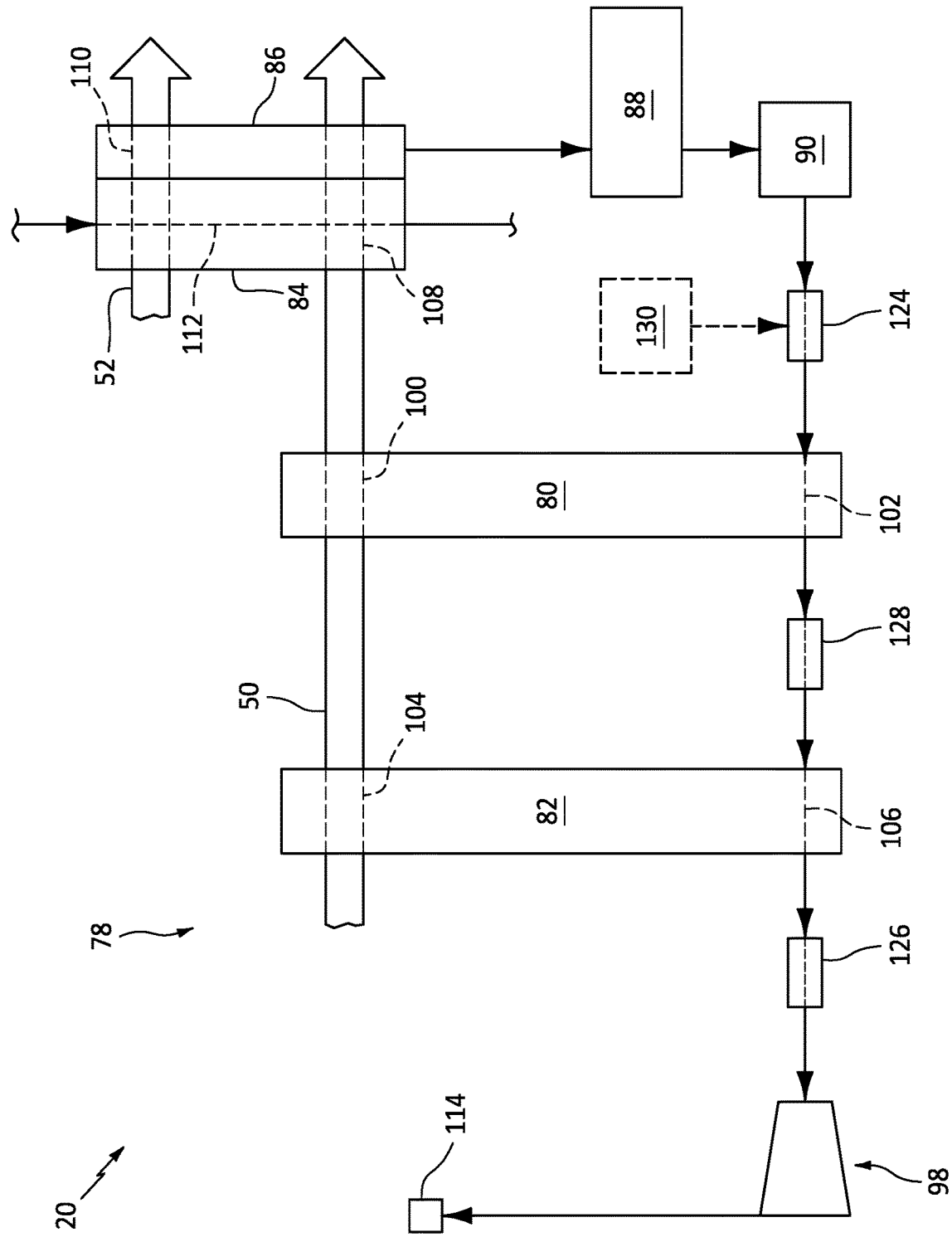
FIGS. 6A-C are partial schematic illustrations of the powerplant with still another water and energy recovery system during various modes of operation.
Figure 6B:
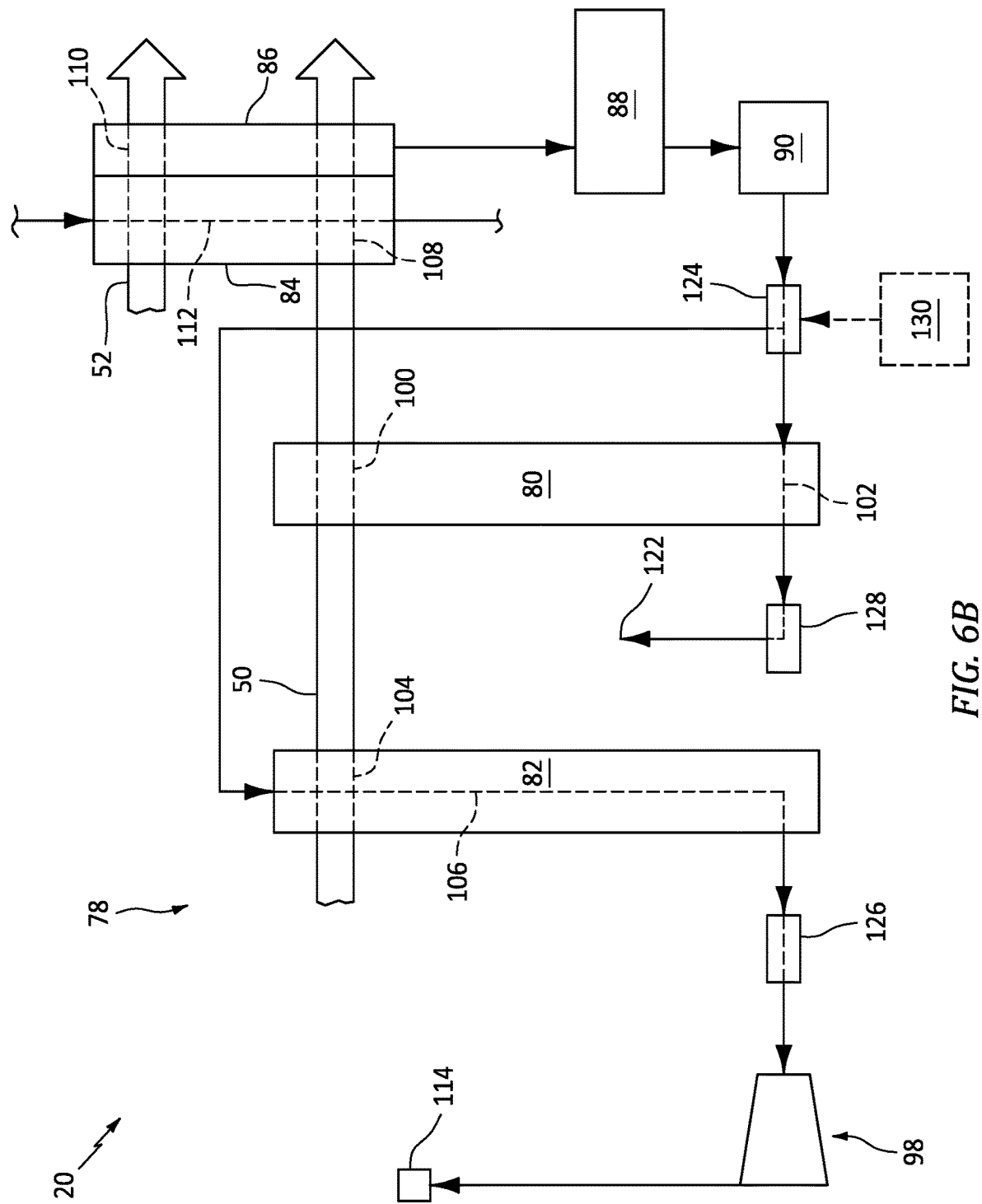
Figure 6C:
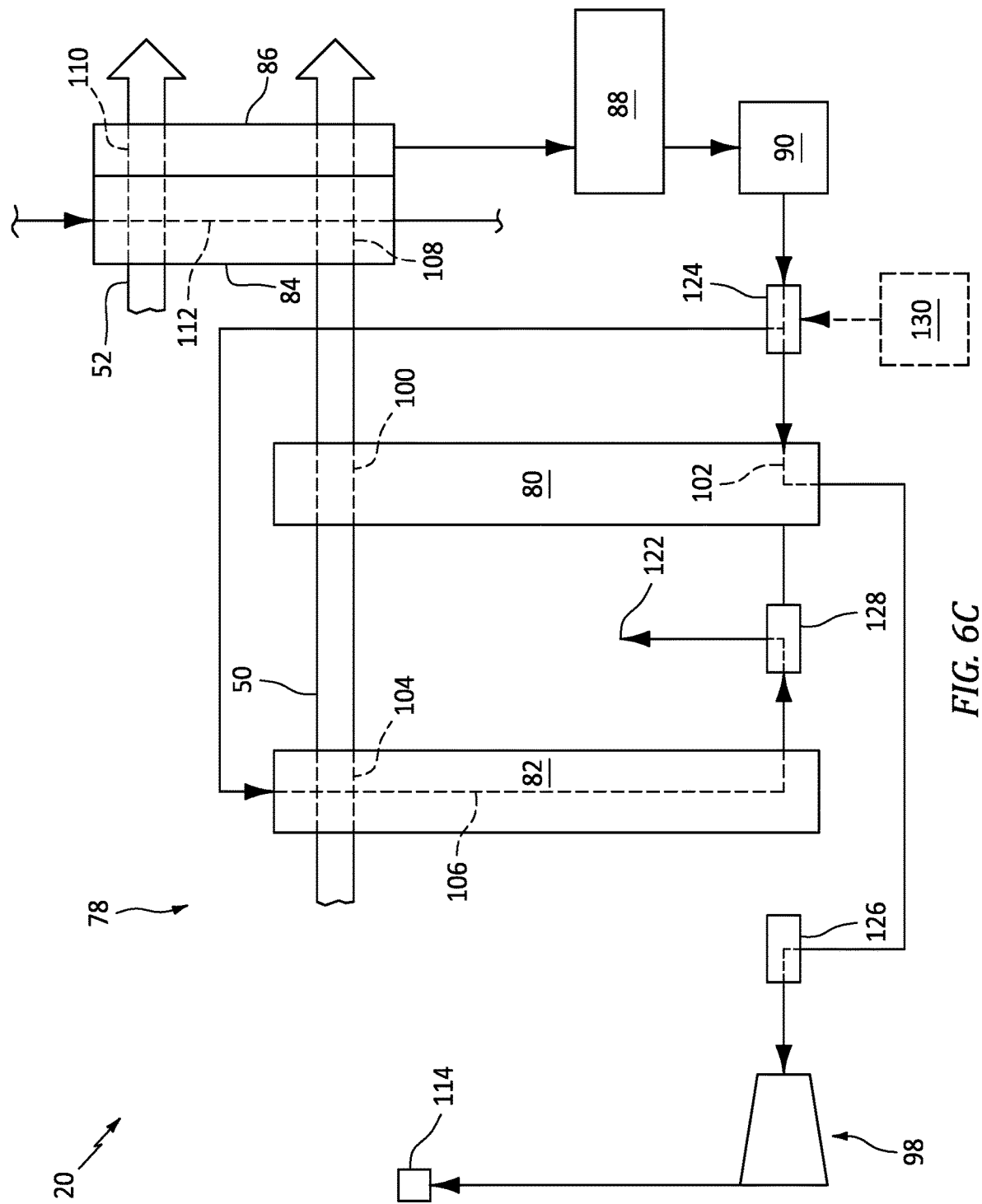

In some embodiments, referring to FIGS. 6A-C, the recovery system 78 may be configured to selectively arrange the first evaporator 80 and the second evaporator 82 in different flow circuits. The first valve system 124, for example, may be arranged between the first evaporator 80 and the water pump 90. The second valve system 126 may be arranged between the second evaporator 82 and the steam turbine 98 and/or the components 114. A third valve system 128 may be arranged between the first evaporator 80 and the second evaporator 82.

During the first mode of operation of FIG. 6A, the working fluid may be directed from the water pump 90, sequentially through the first valve system 124, the first evaporator fluid flowpath 102, the third valve system 128, the second evaporator fluid flowpath 106 and the second valve system 126 to the steam turbine 98. Here, the first evaporator 80 may evaporate some or all of the water into steam, and the second evaporator 82 may heat (e.g., superheat) the steam before providing the heated steam to the steam turbine 98 and/or the components 114.

During the second mode of operation of FIG. 6B, the working fluid may be directed from the water pump 90 into both the first evaporator 80 and the second evaporator 82. A first portion of the working fluid, for example, may be directed sequentially through a path of the first valve system 124, the first evaporator fluid flowpath 102 and a path of the third valve system 128 to the recovery system outlet 122. A second portion of the working fluid may be directed sequentially through another path of the first valve system 124, the second evaporator fluid flowpath 106 and a path of the second valve system 126 to the steam turbine 98. Here, the working fluid (e.g., water or a combination of water and steam) flows through the first evaporator 80 and washes out the material deposits before being exhausted out of the powerplant 20 through the recovery system outlet 122. By contrast, the water flowing within the second evaporator 82 is evaporated into steam and then provided to the steam turbine 98 and/or the components 114.

During the third mode of operation of FIG. 6C, the working fluid may again be directed from the water pump 90 into both the first evaporator 80 and the second evaporator 82. A first portion of the working fluid, for example, may be directed sequentially through a path of the first valve system 124, the first evaporator fluid flowpath 102 and a path of the second valve system 126 to the steam turbine 98. A second portion of the working fluid may be directed sequentially through another path of the first valve system 124, the second evaporator fluid flowpath 106 and a path of the third valve system 128 to the recovery system outlet 122. Here, the water flowing within the first evaporator 80 is evaporated into steam and then provided to the steam turbine 98 and/or the components 114. By contrast, the working fluid (e.g., water or a combination of water and steam) flows through the second evaporator 82 and washes out the material deposits before being exhausted out of the powerplant 20 through the recovery system outlet 122.

In some embodiments, referring to FIGS. 3 and 6A-C, the recovery system 78 may include a detergent source 130. This detergent source 130 is configured to contain a quantity of detergent. The detergent source 130 is also configured to provide a metered flow of the detergent to help facilitate the washing out of the material deposits from the evaporator(s) 80, 82. In the specific arrangements of FIGS. 3, 6B and 6C, the detergent may be combined with the water and provided to the respective evaporator 80, 82 without directing (e.g., any) of the detergent into the steam turbine 98 and/or the components 114. Thus, the detergent may be utilized without injecting the detergent into the core flowpath 50; e.g., into the combustor section 33. The present disclosure, however, is not limited to such exemplary arrangements.

In some embodiments, to facilitate provision of the increased water flowrate during the cleaning mode(s) of operation (e.g., the second and/or the third modes of operation), the recovery system 78 may utilize additional water provided from another (e.g., supplemental) water reservoir and/or a water reservoir for another powerplant of the aircraft.

The cleaning mode(s) of operation may be performed periodically. The cleaning mode(s) of operation, for example, may be performed every set number of flight powerplant operating hours when flight operations and/or flight conditions allow. The cleaning mode(s) of operation may also or alternatively be performed when the engine core 30 is operated below a certain power threshold. The cleaning mode(s) of operation may also or alternatively be performed when a senser system identifies a certain loss in pressure and/or a certain loss in flowrate across one or each of the evaporators 80, 82. Furthermore, it is contemplated the combustor 66 may be non-operational (e.g., turned off) during the cleaning mode(s) of operation.

In some embodiments, the water and/or the detergent may be introduced into the first evaporator fluid flowpath 102 and/or the second evaporator fluid flowpath 106 using one or more additional nozzles. These nozzles may be arranged with the respective evaporator 80, 82 to direct (e.g., high pressure) fluid to select areas within the respective evaporator 80, 82.

The recovery system 78 may be included with various turbine engines other than the one described above. The recovery system 78, for example, may be included in a geared turbine engine where a geartrain connects one or more shafts to one or more rotors. Alternatively, the recovery system 78 may be included in a turbine engine configured without a geartrain. The recovery system 78 may be included in a geared or non-geared turbine engine configured with a single spool, with two spools, or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:
a mechanical load;
a turbine engine core configured to power the mechanical load, the turbine engine core including a core compressor section, a core combustor section and a core turbine section;
a recovery system including a condenser and an evaporator; and
a core flowpath extending sequentially through the core compressor section, the core combustor section, the core turbine section, the evaporator and the condenser from an inlet into the core flowpath to an exhaust from the core flowpath;
the recovery system configured to condense water vapor flowing through the core flowpath into water using the condenser, the recovery system configured to evaporate the water into steam using the evaporator and to provide the steam to the turbine engine core during a first mode of operation, and the recovery system configured to flow the water as liquid water through the evaporator during a second mode of operation without evaporation.

2. The powerplant of claim 1, wherein the recovery system is configured to direct the water into the evaporator at
a first flowrate during the first mode of operation; and
a second flowrate greater than the first flowrate during the second mode of operation.

3. The powerplant of claim 1, wherein the turbine engine core is configured to operate at
a first power setting during the first mode of operation; and
a second power setting less than the first power setting during the second mode of operation.

4. The powerplant of claim 1, wherein the recovery system is configured to at least partially remove a material deposit from within the evaporator by flowing the water through the evaporator during the second mode of operation.

5. The powerplant of claim 1, wherein
the recovery system includes a detergent source; and
the recovery system is further configured to direct a detergent received from the detergent source into the evaporator during the second mode of operation.

6. The powerplant of claim 5, wherein the recovery system is configured to exhaust the water and the detergent, which is output from the evaporator during the second mode of operation, out of the powerplant while bypassing the turbine engine core.

7. The powerplant of claim 1, wherein
the recovery system further includes a steam turbine driven by the steam output from the evaporator during the first mode of operation; and the recovery system is configured to divert the water output from the evaporator away from the steam turbine during the second mode of operation.

8. The powerplant of claim 1, wherein
the recovery system further includes a steam turbine;
the water recovery system is configured to direct the steam output from the evaporator through the steam turbine to a component of the turbine engine core during the first mode of operation; and
the water recovery system is configured to direct the water output from the evaporator to the component of the turbine engine core during the second mode of operation while bypassing the steam turbine.

9. The powerplant of claim 1, wherein
the evaporator is a first evaporator, and the recovery system further includes a second evaporator;
the recovery system is configured to superheat the steam output from the first evaporator using the second evaporator during the first mode of operation; and
the recovery system is configured to evaporate the water output from the first evaporator using the second evaporator during the second mode of operation.

10. The powerplant of claim 1, wherein
the evaporator is a second evaporator, and the recovery system further includes a first evaporator;
the recovery system is configured to preheat the water using the first evaporator and evaporate the preheated water using the second evaporator during the first mode of operation; and
the recovery system is configured to preheat the water using the second evaporator and evaporate the preheated water using the first evaporator during the second mode of operation.

11. The powerplant of claim 1, wherein
the evaporator is a first evaporator, and the recovery system further includes a second evaporator;
the recovery system is configured to superheat the steam output from the first evaporator using the second evaporator during the first mode of operation;
the recovery system is configured to provide a first portion of the water to the first evaporator and a second portion of the water to the second evaporator during the second mode of operation;
the recovery system is configured to flow the first portion of the water through the first evaporator during the second mode of operation; and
the recovery system is configured to evaporate the second portion of the water into steam using the second evaporator during the second mode of operation.

12. The powerplant of claim 11, wherein the recovery system is configured to exhaust the first portion of the water, which is output from the first evaporator during the second mode of operation, out of the powerplant while bypassing the second evaporator.

13. The powerplant of claim 11, wherein
the recovery system is configured to provide a first portion of the water to the first evaporator and a second portion of the water to the second evaporator during a third mode of operation;
the recovery system is configured to evaporate the first portion of the water into steam using the first evaporator during the third mode of operation; and
the recovery system is configured to flow the second portion of the water through the second evaporator during the third mode of operation.

14. The powerplant of claim 1, wherein the mechanical load comprises a propulsor rotor.

15. The powerplant of claim 1, wherein
the turbine engine core further includes a power turbine section configured to drive rotation of the mechanical load; and
the power turbine section is arranged along the core flowpath between the core turbine section and the evaporator.

16. A method for operating an aircraft powerplant, comprising:
exhausting combustion products from a turbine section of a turbine engine core;
condensing water vapor in the combustion products into water using a condenser;
evaporating the water using an evaporator during a first mode of operation to provide steam, and providing the steam to a component of the turbine engine core; and
flowing the water as liquid water through the evaporator without evaporation during a second mode of operation to at least partially remove a material deposit from within the evaporator.

17. The method of claim 16, further comprising at least one of
directing the water into the evaporator during the first mode of operation at a first flow rate and directing the water into the evaporator during the second mode of operation at a second flow rate greater than the first flow rate; or
operating the turbine engine core at a first power setting during the first mode of operation and operating the turbine engine core at a second power setting that is less than the first power setting during the second mode of operation.

18. The method of claim 16, wherein the evaporator is a first evaporator, and further comprising:
superheating the steam output from the first evaporator using a second evaporator during the first mode of operation;
providing a first portion of the water to the first evaporator and a second portion of the water to the second evaporator during the second mode of operation;
flowing the first portion of the water through the first evaporator during the second mode of operation; and
evaporating the second portion of the water into steam using the second evaporator during the second mode of operation.

19. The method of claim 18, further comprising exhausting the first portion of the water, which is output from the first evaporator during the second mode of operation, out of the aircraft powerplant while bypassing the second evaporator.

20. The method of claim 18, further comprising:
providing a first portion of the water to the first evaporator and a second portion of the water to the second evaporator during a third mode of operation;
evaporating the first portion of the water into steam using the first evaporator during the third mode of operation; and
flowing the second portion of the water through the second evaporator during the third mode of operation.

* * * * *